UNITED STATES PATENT OFFICE.

JOHN C. WICHMANN, OF LOS ANGELES, CALIFORNIA.

PROCESS OF MAKING RUBBER-LIKE MATERIAL AND RESULTING PRODUCT.

1,379,149.  Specification of Letters Patent.  Patented May 24, 1921.

No Drawing.  Application filed September 3, 1920.  Serial No. 407,893.

*To all whom it may concern:*

Be it known that I, JOHN C. WICHMANN, a citizen of the United States, residing at Los Angeles, in the county of Los Angeles and State of California, have invented new and useful Improvements in Processes of Making Rubber-Like Material and Resulting Product, of which the following is a specification.

My invention relates to a process of making a rubber-like material, and the resulting product.

It is the object of this invention to treat certain plants in a manner to form a product which is very similar to the Pará rubber of commerce.

I have discovered that the members of the cactus family (*Cactaceæ*.) The Burbank spineless cactus, (prickly pear), and ocotilla are especially adapted to my purpose.

My invention consists in the steps of the process and the resulting product hereinafter described and claimed.

The cactus plant is macerated and placed in a steam jacketed boiler and cooked for about half an hour at ten pounds pressure, or 240° F. This temperature will release all the gummy and mucilaginous substances next to the skin of the plant where they are found in greatest abundance. The cooked pulp is now put into a suitable press and the juice extracted therefrom. The following ingredients are now added to the juice, the quantities being based on a ton of cactus material: 9 to 10 ounces of sodium tungstate, 3 ounces of molybdic acid, and 3 ounces of calcium molybdate. The sodium tungstate, molybdic acid and calcium molybdate act as a catalyzer in changing the nature of the gummy or mucilaginous substances in the juice in a manner that combined with the subsequent treatment, a rubber-like substance is finally obtained.

I have found that the best results are obtained by taking the three agents in combination and in the proportions stated, although any one alone, or two of them may be used, in which case, however, the quantities of the agents must be increased to correspond to the total quantity of the three catalyzers in combination.

The catalyzer is thoroughly mixed with the juices and the latter is concentrated to the thickness of molasses. A ton of cactus material yielding about 156 pounds of concentrated juice. Next, 5 pounds of Pará rubber are dissolved in turpentine and 25 pounds of high grade asphaltum mixed with 5 pounds of flour sulfur are melted, preferably in a steam jacketed boiler. I now take 2½ pounds of raw linseed oil and the Pará rubber solution and the mixture of asphaltum and sulfur and add the same to the juices which are now boiled in a steam jacketed boiler for two hours, preferably at a steam pressure of 20 pounds. The whole mass is continually stirred during the boiling operation. After the boiling operation the mixture is poured into evaporating pans, preferably of low depth, and heated to a temperature of about 150° F. The mass gradually oxidizes and solidifies, requiring from one to one and a half days to become solid. The rubber solution acts as a catalyzer in converting the gummy and mucilaginous substances in the juice to a rubber-like material and is assisted by the asphaltum and sulfur. The linseed oil acts as a binder and assists in oxidizing the juices. The resulting product is dark in color and resembles the crude Pará rubber of commerce.

My product may now be treated like any other crude rubber in the manufacture of rubber articles such as inner tubes, tire casings, rubber heels and the like.

I claim:

1. A process of making a rubber-like substance, comprising macerating the fleshy parts of members of the cactus family, heating the same, extracting the juice therefrom, adding a catalyzer containing a mineral acid radical, concentrating the juice, adding a solution of Pará rubber, linseed oil, and a mixture of asphaltum and sulfur to the concentrated juice, boiling the same, and drying and oxidizing the resulting mass.

2. A process of making a rubber-like substance, comprising macerating the fleshy parts of members of the cactus family, heating the same above the boiling point of water, extracting the juice therefrom, adding a catalyzer containing sodium tungstate, concentrating the juice, adding a solution of Pará rubber in turpentine, linseed oil, and a molten solution of asphaltum and sulfur to the concentrated juice, boiling the same, agitating the mixture, and drying and oxidizing the resulting mass.

3. A process of making a rubber-like substance, comprising macerating the fleshy parts of members of the cactus family, heating the same above the boiling point of water, extracting the juice therefrom, adding a catalyzer consisting of a mixture of sodium tungstate, molybdic acid, and calcium molybdate, concentrating the juice, adding a solution of Pará rubber, linseed oil, and a molten solution of asphaltum and sulfur to the concentrated juice, boiling the same under agitation, and drying and oxidizing the resulting mass.

4. A process of making a rubber-like substance, comprising macerating the fleshy parts of the members of the cactus family, heating the same above the boiling point of water, extracting the juice therefrom, adding a catalyzer consisting of approximately 10 ounces of sodium tungstate, 3 ounces of molybdic acid, and 3 ounces of calcium molybdate, concentrating the juice, adding a solution of 5 pounds of Pará rubber dissolved in turpentine, 2½ pounds of raw linseed oil, and a molten solution of 25 pounds of asphaltum mixed with 5 pounds of sulfur to the concentrated juice, and drying and oxidizing the resulting mass, the quantities of re-agents enumerated being based on 2000 pounds of cactus.

In testimony whereof I have signed my name to this specification.

JOHN C. WICHMANN.